United States Patent
Horie et al.

(10) Patent No.: US 11,163,594 B2
(45) Date of Patent: Nov. 2, 2021

(54) RESCHEDULING JIT COMPILATION BASED ON JOBS OF PARALLEL DISTRIBUTED COMPUTING FRAMEWORK

(71) Applicant: INTERNATIONAL BUSINESS MACHINES CORPORATION, Armonk, NY (US)

(72) Inventors: Michihiro Horie, Saitama (JP); Tatsuhiro Chiba, Tokyo (JP); Kazunori Ogata, Saitama (JP); Hiroshi Horii, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 181 days.

(21) Appl. No.: 16/667,341

(22) Filed: Oct. 29, 2019

(65) Prior Publication Data

US 2021/0124600 A1    Apr. 29, 2021

(51) Int. Cl.
*G06F 9/455*    (2018.01)
*G06F 8/41*    (2018.01)

(52) U.S. Cl.
CPC ............ *G06F 9/4552* (2013.01); *G06F 8/453* (2013.01)

(58) Field of Classification Search
None
See application file for complete search history.

(56) References Cited

U.S. PATENT DOCUMENTS

| 7,568,190 B2 * | 7/2009 | Creamer | G06F 9/45516 717/148 |
| 8,176,480 B1 * | 5/2012 | Spertus | G06F 8/443 717/158 |

(Continued)

OTHER PUBLICATIONS

P. A. Kulkarni and J. Fuller, "JIT Compilation Policy on Single-Core and Multi-core Machines," 2011 15th Workshop on Interaction between Compilers and Computer Architectures, 2011, pp. 54-62, doi: 10.1109/INTERACT.2011.9. (Year: 2011).*

(Continued)

*Primary Examiner* — Andrew M. Lyons
(74) *Attorney, Agent, or Firm* — Tutunjian & Bitetto, P.C.; Randall Bluestone (57) ABSTRACT

A computer-implemented method is provided for compilation rescheduling from among four compilation levels comprising level 1, level 2, level 3, and level 4 on a parallel distributed computing framework running processes for a plurality of jobs of a virtual machine. The method bypasses a program analysis overhead that includes measuring a compiled method execution time by identifying completed compilation levels of a Just In Time compilation. The method finds a repetition of a same process in the processes for the plurality of jobs of the virtual machine from profiles by comparing main class names, virtual machine parameters, and Jar file types therein. The method applies a compilation scheduling for the same process a next time the same process runs based on a result of the checking the transition, by (i) compiling at the level 1 at least some methods for the same process responsive to the virtual (Continued)

machine finishing without compiling the at least some methods for the same process at the level 4 after compiling the at least some of the methods at a level in between the level 1 and the level 4, and (ii) compiling at the level 4 at least a subset of the methods earlier than an original scheduled time responsive to at least the subset of the methods compiled at the level 4 being infrequently invoked below a threshold amount.

20 Claims, 4 Drawing Sheets

(56) References Cited

U.S. PATENT DOCUMENTS

| | | | | |
|---|---|---|---|---|
| 8,448,140 | B2* | 5/2013 | Isshiki | G06F 11/3447 |
| | | | | 717/124 |
| 8,543,907 | B1* | 9/2013 | Roskind | G06F 8/443 |
| | | | | 715/234 |
| 9,535,673 | B1* | 1/2017 | Cui | G06F 8/4441 |
| 10,108,442 | B1 | 10/2018 | Camarda Silva Folco et al. | |
| 2007/0061793 | A1* | 3/2007 | Inglis | G06F 9/45516 |
| | | | | 717/151 |
| 2008/0168433 | A1* | 7/2008 | Arnold | G06F 11/3688 |
| | | | | 717/158 |
| 2010/0325619 | A1* | 12/2010 | Song | G06F 8/443 |
| | | | | 717/143 |
| 2011/0035735 | A1* | 2/2011 | Kramp | G06F 9/4552 |
| | | | | 717/148 |
| 2013/0091496 | A1* | 4/2013 | Bareness | G06F 9/45516 |
| | | | | 717/148 |
| 2013/0125102 | A1* | 5/2013 | Kimura | G06F 9/4552 |
| | | | | 717/148 |
| 2013/0305230 | A1* | 11/2013 | Inoue | G06F 9/4552 |
| | | | | 717/153 |
| 2016/0062878 | A1* | 3/2016 | Westrelin | G06F 9/4552 |
| | | | | 717/130 |
| 2017/0269915 | A1 | 9/2017 | Pirvu | |
| 2019/0220294 | A1* | 7/2019 | Horie | G06F 9/45533 |
| 2019/0317740 | A1* | 10/2019 | Herr | G06F 8/41 |
| 2020/0241855 | A1* | 7/2020 | McCallum | G06F 9/3005 |
| 2020/0326918 | A1* | 10/2020 | Venka | G06F 9/4552 |

OTHER PUBLICATIONS

Lion et al., "Don't Get Caught In the Cold, Warm-up Your JVM", Proceedings of the 12th USENIX Symposium on Operating Systems Design and Implementation (OSDI '16), Nov. 2016, pp. 1-19.

Welc et al., "Improving Virtual Machine Performance Using a Cross-Run Profile Repository", ACM SIGPLAN Notices—Oct. 2005, pp. 1-16.

* cited by examiner

RESCHEDULING JIT COMPILATION BASED ON JOBS OF PARALLEL DISTRIBUTED COMPUTING FRAMEWORK

BACKGROUND

The present invention generally relates to distributed computing, and more particularly to rescheduling a Just In Time (JIT) compilation based on jobs of a parallel distributed computing framework.

Parallel distributed computing frameworks such as Spark® and Hadoop® run a Java® process for each job. As a result, many Java® processes start and finish frequently to process many jobs. Open Java Development Kit (OpenJDK) equips a tiered compilation mechanism in the JIT compilation.

Just In Time (JIT) compilation in the Open Java Development Kit (OpenJDK) has four compilation levels. A higher level of JIT compilation generates faster code but takes more time. The four compilation levels are as follows:
Level 1: lightweight compilation without profiling.
Level 2: lightweight compilation with lightweight profiling.
Level 3: lightweight compilation with heavyweight profiling.
Level 4: heavyweight compilation by using the profiling result taken at Level 2 or 3.

A method will be once compiled at a level from 1 to 3, then it will be further compiled at level 4. By default, the order of method compilation is (1) compiled at level 3 and (2) compiled at level 4.

Level 3 compilation generates code including profiling. Level 2 compilation also generates code including profiling, but it has more light-weight profiling that will provide less information compared to the level 3. Level 1 compilation inserts no profiling code. Faster compiled code can be generated at level 4 compilation using the richer profile information with level 3.

Before the methods compiled at level 2 or 3 are compiled at level 4, the JVM may finish. There is no return from the cost paid for compiling at level 2 or 3. Hence, there is a need for rescheduling a JIT compilation based on jobs of a parallel distributed computing framework (e.g., Spark®, MapReduce, etc.).

SUMMARY

According to an aspect of the present invention, a computer-implemented method is provided for compilation rescheduling from among four compilation levels comprising level 1, level 2, level 3, and level 4 on a parallel distributed computing framework running processes for a plurality of jobs of a virtual machine. The method includes bypassing a program analysis overhead that includes measuring a compiled method execution time by identifying completed compilation levels of a Just In Time compilation. The method further includes finding a repetition of a same process in the processes for the plurality of jobs of the virtual machine from profiles by comparing main class names, virtual machine parameters, and Jar file types therein. The method also includes applying a compilation scheduling for the same process a next time the same process runs based on a result of the checking the transition, by (i) compiling at the level 1 at least some methods for the same process responsive to the virtual machine finishing without compiling the at least some methods for the same process at the level 4 after compiling the at least some of the methods at a level in between the level 1 and the level 4, and (ii) compiling at the level 4 at least a subset of the methods earlier than an original scheduled time responsive to at least the subset of the methods compiled at the level 4 being infrequently invoked below a threshold amount.

According to another aspect of the present invention, a computer program product is provided for compilation rescheduling from among four compilation levels comprising level 1, level 2, level 3, and level 4 on a parallel distributed computing framework running processes for a plurality of jobs of a virtual machine. The computer program product includes a non-transitory computer readable storage medium having program instructions embodied therewith. The program instructions are executable by a computer to cause the computer to perform a method. The method includes bypassing a program analysis overhead that includes measuring a compiled method execution time by identifying completed compilation levels of a Just In Time compilation. The method further includes finding a repetition of a same process in the processes for the plurality of jobs of the virtual machine from profiles by comparing main class names, virtual machine parameters, and Jar file types therein. The method also includes applying a compilation scheduling for the same process a next time the same process runs based on a result of the checking the transition, by (i) compiling at the level 1 at least some methods for the same process responsive to the virtual machine finishing without compiling the at least some methods for the same process at the level 4 after compiling the at least some of the methods at a level in between the level 1 and the level 4, and (ii) compiling at the level 4 at least a subset of the methods earlier than an original scheduled time responsive to at least the subset of the methods compiled at the level 4 being infrequently invoked below a threshold amount.

According to yet another aspect of the present invention, a computer processing system is provided for compilation rescheduling from among four compilation levels comprising level 1, level 2, level 3, and level 4 on a parallel distributed computing framework running processes for a plurality of jobs of a virtual machine. The computer processing system includes a memory device including program code stored thereon. The computer processing system further includes a hardware processor, operatively coupled to the memory device, and configured to run the program code stored on the memory device to bypass a program analysis overhead that includes measuring a compiled method execution time by identifying completed compilation levels of a Just In Time compilation. The processor further runs the program code to find a repetition of a same process in the processes for the plurality of jobs of the virtual machine from profiles by comparing main class names, virtual machine parameters, and Jar file types therein. The processor also runs the program code to apply a compilation scheduling for the same process a next time the same process runs based on a result of the checking the transition, by (i) compiling at the level 1 at least some methods for the same process responsive to the virtual machine finishing without compiling the at least some methods for the same process at the level 4 after compiling the at least some of the methods at a level in between the level 1 and the level 4, and (ii) compiling at the level 4 at least a subset of the methods earlier than an original scheduled time responsive to at least the subset of the methods compiled at the level 4 being infrequently invoked below a threshold amount.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to rescheduling a JIT compilation based on jobs of a parallel distributed computing framework.

In an embodiment, during a run of the parallel distributed computing framework, the present invention applies more suitable compilation scheduling for methods in each JVM run by checking the existence of useless compilations at an early stage of the workload's run. As used herein, the term "useless compilations" refers to compilations of methods that are not invoked after the compilations.

In an embodiment, the checking of the existence of useless compilations is light-weight. For example, the present invention avoids general analysis overhead such as, for example, measuring the compiled method execution time and a feedback system.

In an embodiment, the present invention aggregates the information in accordance with the characteristics of workload's jobs.

In an embodiment, the present invention improves compiling by using only information on what level and how many times the number of point calls of the invention is compiled (it is not necessary to measure the actual speed of the compiled code).

In an embodiment, the present invention outputs and selects the optimum profile information that can be used before JVM startup and information that can only be used after JVM startup. The information that can be used before JVM startup includes, but is not limited to, the main class name that is specified in the JVM parameter. The information that can only be used after JVM startup includes, but is not limited to, a Jar file used for processing an assigned job.

Figure 1:
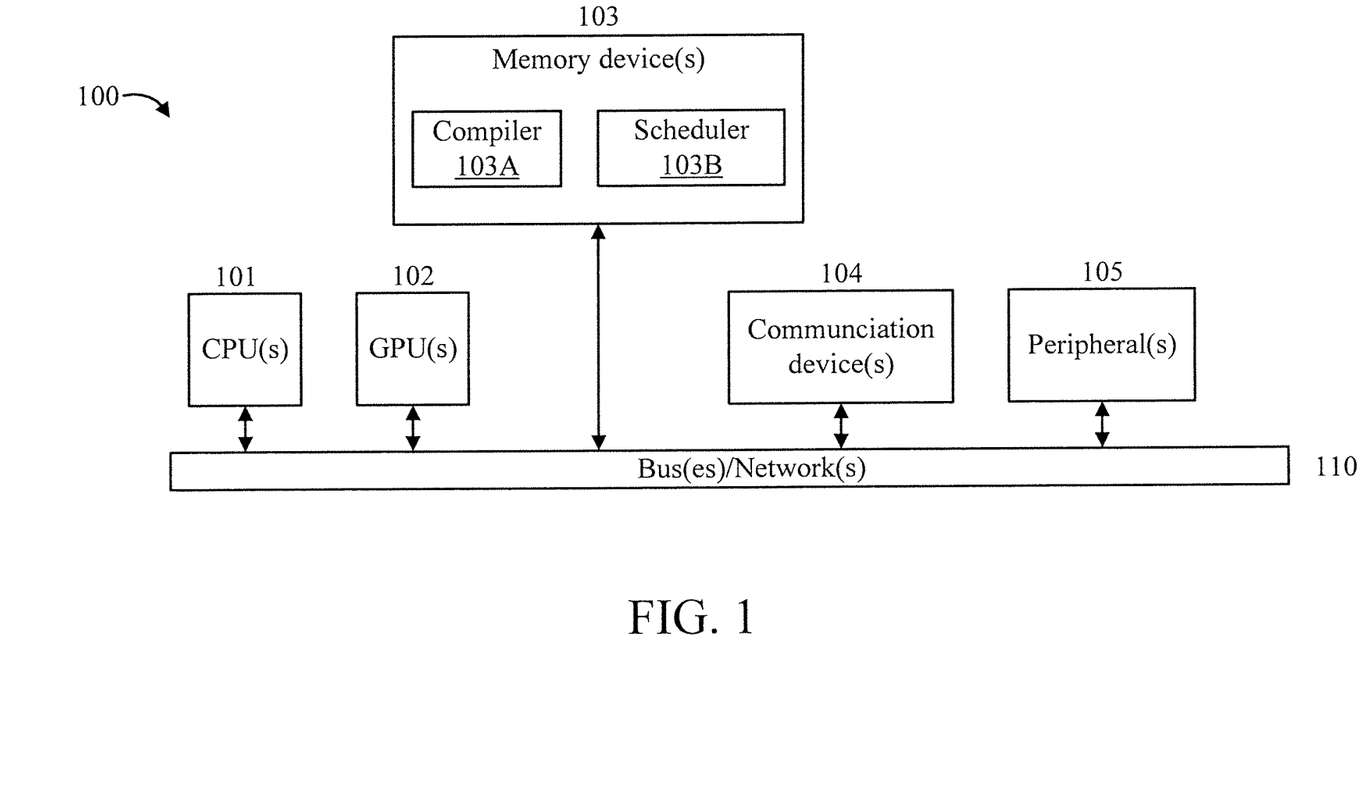
FIG. 1 is a block diagram showing an exemplary processing system 100, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. In an embodiment, the memory devices 103 include a compiler 103A (e.g., a JIT compiler) and a scheduler 103B. While shown as separate elements in the embodiment of FIG. 2, in other embodiments the compiler 103A and scheduler 103B can integrated together into a single component. The scheduler 103B is configured to perform scheduling/rescheduling in accordance with the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
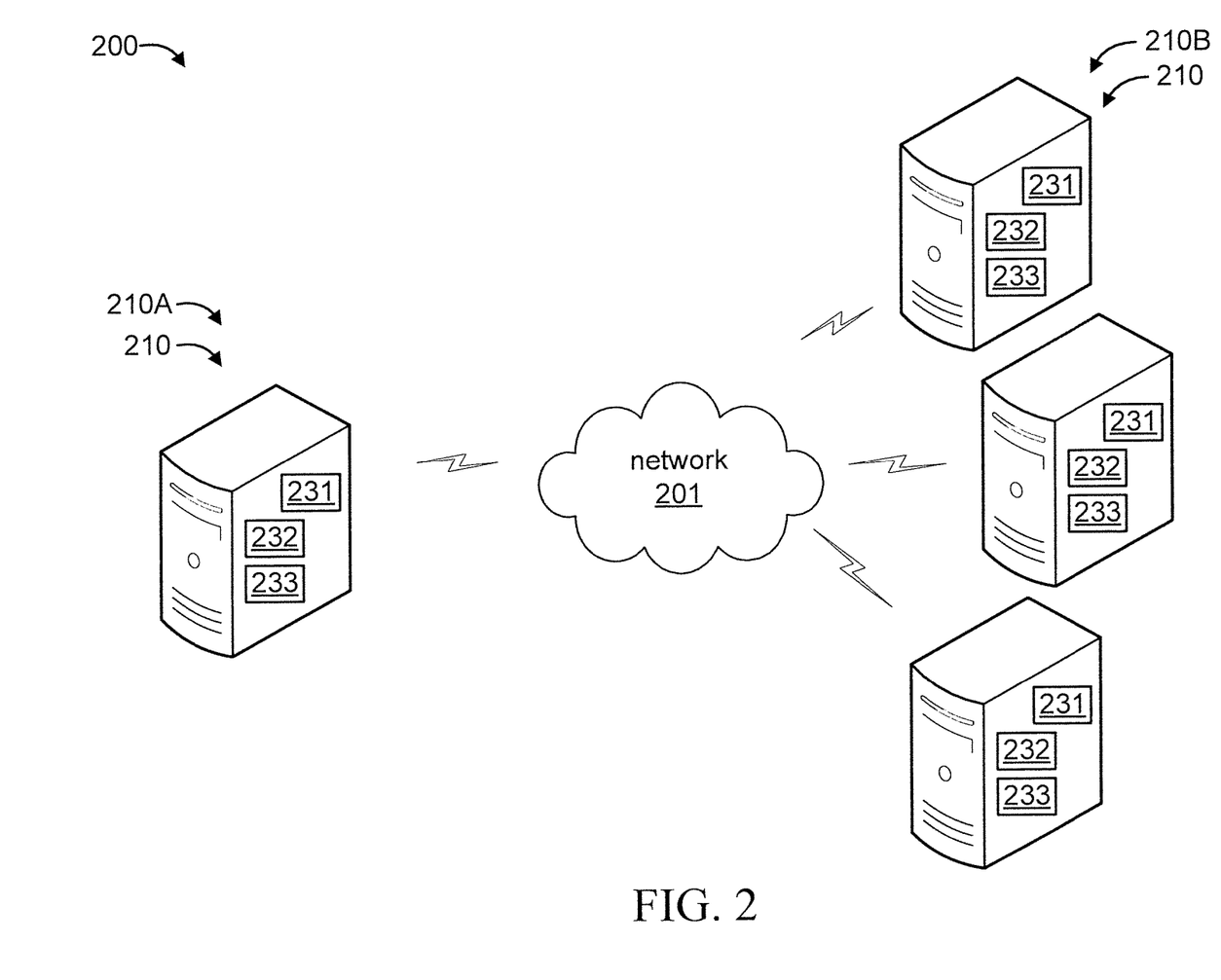
FIG. 2 is a block diagram showing an exemplary environment 200 to which the present invention can be applied, in accordance with an embodiment of the present invention.

FIG. 2 is a block diagram showing an exemplary environment 200 to which the present invention can be applied, in accordance with an embodiment of the present invention. The environment 200 is representative of a parallel distributed computing framework to which the present invention can be applied. The parallel distributed computing framework can be, but is not limited to, Spark®, Hadoop®, MapReduce, and so forth. The elements shown relative to FIG. 2 are set forth for the sake of illustration. However, it is to be appreciated that the present invention can be applied to other configurations and other operational environments as readily contemplated by one of ordinary skill in the art given the teachings of the present invention provided herein, while maintaining the spirit of the present invention.

The environment 200 at least includes multiple computing nodes 210 connected in a parallel distributed computing framework. The multiple computing nodes 210 form a cluster 299 of machines. In an embodiment, in the cluster 299, one of the computing nodes 210 can act as a master 210M, while other ones of the computing nodes can act as slaves 210S. In an embodiment, each of the computing nodes 210 can include one or more servers or other computing machines.

Each of the computing nodes 210 can at least include a processing element 231, a memory 232, and a communication device 233. The communication device 233 can be, for example, but is not limited to, a wireless transceiver, an Ethernet adapter, a Network Interface Card (NIC), and so forth.

Each of the computing nodes 210 is configured to implement the present invention, namely rescheduling a JIT compilation based on jobs of a parallel distributed computing framework.

In the embodiment shown in FIG. 2, the elements thereof are interconnected by a network(s) 201. However, in other embodiments, other types of connections can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

Figure 3:
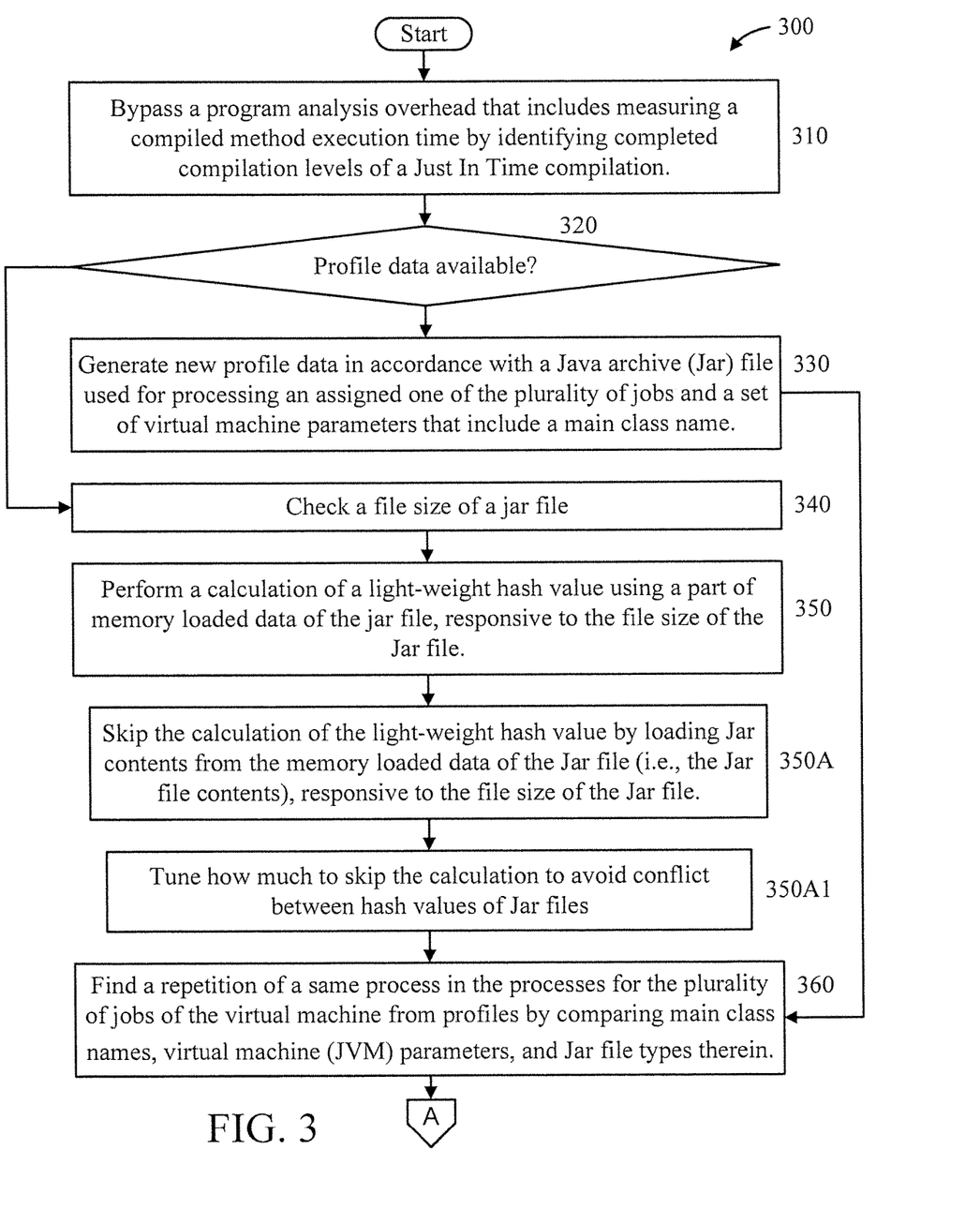
FIGS. 3-4 are flow diagrams showing an exemplary computer-implemented method 300 for compilation rescheduling from among four compilation levels including level 1, level 2, level 3, and level 4 on a parallel distributed computing framework running processes for a plurality of jobs of a virtual machine, in accordance with an embodiment of the present invention.
Figure 4:
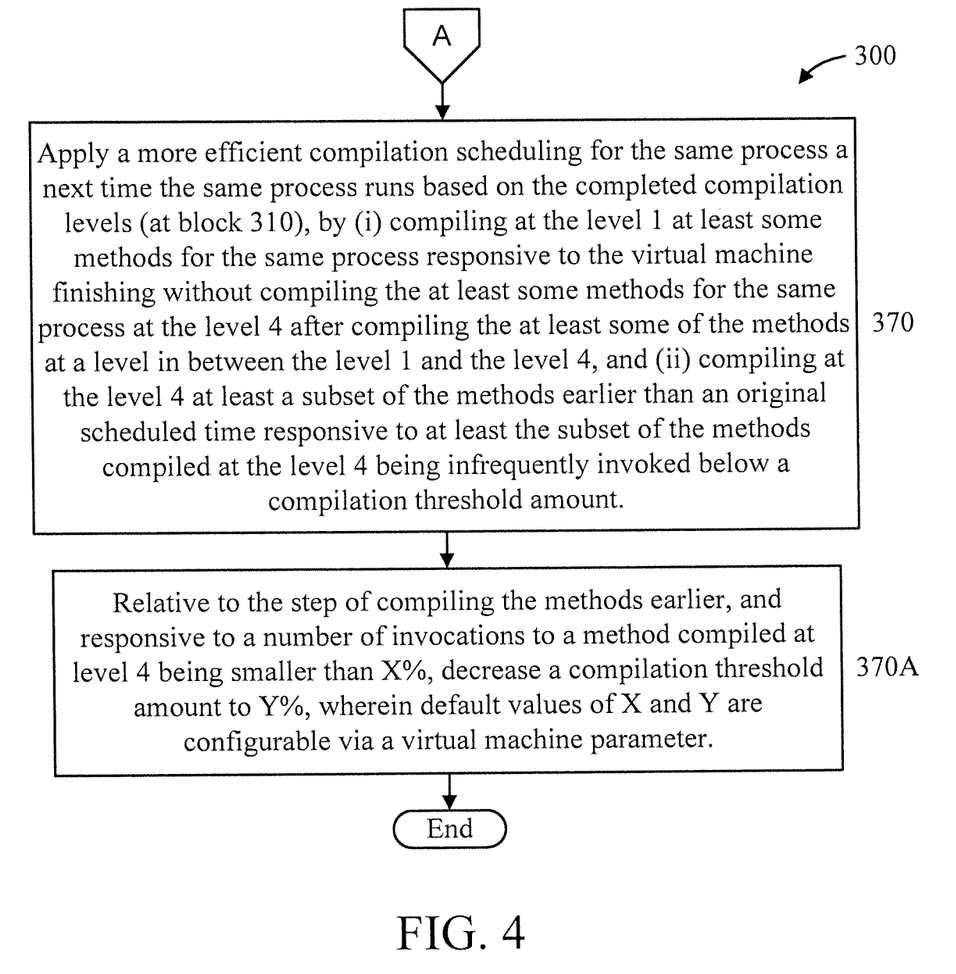

FIGS. 3-4 are flow diagrams showing an exemplary computer-implemented method 300 for compilation rescheduling from among four compilation levels including level 1, level 2, level 3, and level 4 on a parallel distributed computing framework running processes for a plurality of jobs of a virtual machine, in accordance with an embodiment of the present invention.

At block 310, bypass a program analysis overhead that includes measuring a compiled method execution time by identifying completed compilation levels of a Just In Time compilation. Thus, in an embodiment, only the completed compilation levels are checked so as to avoid the program analysis overhead.

At block 320, determine if there is profile data available. If so, then proceed to block 340. Otherwise, proceed to block 330. In an embodiment, this determination can initially be made based on the actually completed levels identified in block 310. For example, if the actually completed levels only include the completion of level 1, then it is known that there is no profile data since profile 1 involves lightweight compilation without profiling. In an embodiment, this determination can be made by checking a file size and a hash value of a Jar file.

At block 330, generate new profile data in accordance with a Java archive (Jar) file used for processing an assigned one of the plurality of jobs and a set of virtual machine parameters that include a main class name. The contents of the Jar file include a collection of method definitions acquired from the file system after starting the JVM.

At block 340, check a file size of a Jar file.

At block 350, perform a calculation of a light-weight hash value using a part of memory loaded data of the jar file, responsive to the file size of the Jar file.

In an embodiment, block 350A can include blocks 350A and 350B.

At block 350A, skip the calculation of the light-weight hash value by loading Jar contents from the memory loaded data of the Jar file (i.e., the Jar file contents), responsive to the file size of the Jar file. To be clear, the loaded data and the Jar contents are the same.

In an embodiment, block 350A can include block 350A1.

At block 350B, tune how much to skip the calculation to avoid conflict between hash values of Jar files. Default value of the amount can be 10% of the size of the Jar contents, for example. This can be tunable via the JVM parameter. When there are many profile data available, developers can specify a fewer number than 10% with their JVM parameters in order to avoid the conflict of the hash value. In contrast, when there are only a few profile data available, they can specify a larger number than 10% because one can expect the hash value will not conflict.

At block 360, find a repetition of a same process in the processes for the plurality of jobs of the virtual machine from profiles by comparing main class names, virtual machine (JVM) parameters, and Jar file types therein.

At block 370, apply a more efficient compilation scheduling for the same process a next time the same process runs based on the completed compilation levels (at block 310), by (i) compiling at the level 1 at least some methods for the same process responsive to the virtual machine finishing without compiling the at least some methods for the same process at the level 4 after compiling the at least some of the methods at a level in between the level 1 and the level 4, and (ii) compiling at the level 4 at least a subset of the methods earlier than an original scheduled time responsive to at least the subset of the methods compiled at the level 4 being infrequently invoked below a compilation threshold amount. Regarding (i), the same is beneficial because unnecessary compilation for a method can be avoided. Regarding (ii), the same is beneficial because method can be compiled earlier and JVM can execute a faster compiled method.

In an embodiment, block 370 can include block 370A.

At block 370A, relative to the step of compiling the methods earlier, and responsive to a number of invocations to a method compiled at level 4 being smaller than X %, decrease a compilation threshold amount to Y %, wherein default values of X and Y are configurable via a virtual machine parameter.

The same process is then executed according to the more efficient compilation scheduling, as per block 370.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for compilation rescheduling from among four compilation levels comprising level 1, level 2, level 3, and level 4 on a parallel distributed computing framework running processes for a plurality of jobs of a virtual machine, the method comprising:
   bypassing a program analysis overhead that includes measuring a compiled method execution time by identifying completed compilation levels of a Just In Time compilation;
   finding a repetition of a same process in the processes for the plurality of jobs of the virtual machine from profiles by comparing main class names, virtual machine parameters, and Jar file types therein; and
   applying a compilation scheduling for the same process a next time the same process runs based on a result of the checking the transition, by (i) compiling at the level 1 at least some methods for the same process responsive to the virtual machine finishing without compiling the at least some methods for the same process at the level 4 after compiling the at least some of the methods at a level in between the level 1 and the level 4, and (ii) compiling at the level 4 at least a subset of the methods earlier than an original scheduled time responsive to at least the subset of the methods compiled at the level 4 being infrequently invoked below a threshold amount.

2. The computer-implemented method of claim 1, wherein said step of compiling the methods earlier comprises, responsive to a number of invocations to a method compiled at level 4 being smaller than X %, decreasing the threshold amount to Y %, and wherein X and Y are integers.

3. The computer-implemented method of claim 2, wherein default values of X and Y are configurable via a virtual machine parameter.

4. The computer-implemented method of claim 1, further comprising generating new profile data in accordance with a Jar file used for processing an assigned one of the plurality of jobs and a set of virtual machine parameters that include a main class name, responsive to a lack of profile data for the virtual machine corresponding to the level 1.

5. The computer-implemented method of claim 1, wherein the method further comprises selecting profiling data for the virtual machine, wherein said selecting step comprises:
   checking a file size of a Jar file;
   performing a calculation of a light-weight hash value using a part of memory loaded file data of the Jar file.

6. The computer-implemented method of claim 5, further comprising:
   skipping the calculation of the light-weight hash value by loading Jar contents from the memory loaded file data of the Jar file, responsive to the file size of the Jar file; and
   tuning how much to skip the calculation to avoid conflict between hash values of Jar files, responsive to the file size of the Jar file.

7. The computer-implemented method of claim 1, wherein only the completed compilation levels are checked to avoid the program analysis overhead.

8. The computer-implemented method of claim 1, wherein the level 1 comprises a lightweight compilation without profiling, the level 2 comprises a lightweight compilation with lightweight profiling, the level 3 comprises the lightweight compilation with heavyweight profiling, and the level 4 comprises a heavyweight compilation with a lower level profiling.

9. The computer-implemented method of claim 1, wherein the method is configured to reduce useless compilations.

10. The computer-implemented method of claim 1, wherein at least said bypassing and finding steps are performed off-line.

11. A computer program product for compilation rescheduling from among four compilation levels comprising level 1, level 2, level 3, and level 4 on a parallel distributed computing framework running processes for a plurality of jobs of a virtual machine, the computer program product comprising a non-transitory computer readable storage medium having program instructions embodied therewith, the program instructions executable by a computer to cause the computer to perform a method comprising:
   bypassing a program analysis overhead that includes measuring a compiled method execution time by identifying completed compilation levels of a Just In Time compilation;
   finding a repetition of a same process in the processes for the plurality of jobs of the virtual machine from profiles by comparing main class names, virtual machine parameters, and Jar file types therein; and
   applying a compilation scheduling for the same process a next time the same process runs based on a result of the checking the transition, by (i) compiling at the level 1 at least some methods for the same process responsive to the virtual machine finishing without compiling the at least some methods for the same process at the level 4 after compiling the at least some of the methods at a level in between the level 1 and the level 4, and (ii) compiling at the level 4 at least a subset of the methods earlier than an original scheduled time responsive to at least the subset of the methods compiled at the level 4 being infrequently invoked below a threshold amount.

12. The computer program product of claim 11, wherein said step of compiling the methods earlier comprises, responsive to a number of invocations to a method compiled at level 4 being smaller than X %, decreasing the threshold amount to Y %, and wherein X and Y are integers.

13. The computer program product of claim 12, wherein default values of X and Y are configurable via a virtual machine parameter.

14. The computer program product of claim 11, wherein the method further comprises generating new profile data in accordance with a Jar file used for processing an assigned one of the plurality of jobs and a set of virtual machine parameters that include a main class name, responsive to a lack of profile data for the virtual machine corresponding to the level 1.

15. The computer program product of claim 11, wherein the method further comprises selecting profiling data for the virtual machine, wherein said selecting step comprises:
   checking a file size a Jar file;
   performing a calculation of a light-weight hash value using a part of memory loaded file data of the Jar file.

16. The computer program product of claim 15, further comprising
   skipping the calculation of the light-weight hash value by loading Jar contents from the memory loaded file data of the Jar file, responsive to the file size of the Jar file; and
   tuning how much to skip the calculation to avoid conflict between hash values of Jar files, responsive to the file size of the Jar file.

17. The computer program product of claim 11, wherein only the completed compilation levels are checked to avoid the program analysis overhead.

18. The computer program product of claim 11, wherein the level 1 comprises a lightweight compilation without profiling, the level 2 comprises a lightweight compilation with lightweight profiling, the level 3 comprises the lightweight compilation with heavyweight profiling, and the level 4 comprises a heavyweight compilation with a lower level profiling.

19. The computer program product of claim 11, wherein the method is configured to reduce useless compilations.

20. A computer processing system for compilation rescheduling from among four compilation levels comprising level 1, level 2, level 3, and level 4 on a parallel distributed computing framework running processes for a plurality of jobs of a virtual machine, comprising:
 a memory device including program code stored thereon;
 a hardware processor, operatively coupled to the memory device, and configured to run the program code stored on the memory device to
 bypass a program analysis overhead that includes measuring a compiled method execution time by identifying completed compilation levels of a Just In Time compilation;
 find a repetition of a same process in the processes for the plurality of jobs of the virtual machine from profiles by comparing main class names, virtual machine parameters, and Jar file types therein; and
 apply a compilation scheduling for the same process a next time the same process runs based on a result of the checking the transition, by (i) compiling at the level 1 at least some methods for the same process responsive to the virtual machine finishing without compiling the at least some methods for the same process at the level 4 after compiling the at least some of the methods at a level in between the level 1 and the level 4, and (ii) compiling at the level 4 at least a subset of the methods earlier than an original scheduled time responsive to at least the subset of the methods compiled at the level 4 being infrequently invoked below a threshold amount.

* * * * *